Figure 1:
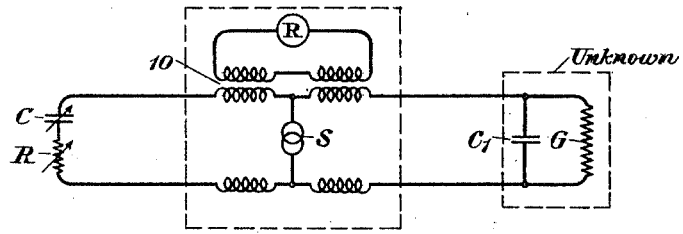
Figure 2:
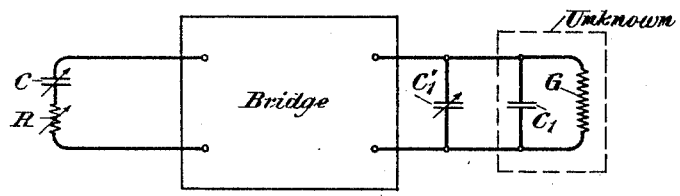

May 3, 1932.  L. T. WILSON  1,856,202

TESTING APPARATUS

Filed June 10, 1931

INVENTOR
L. T. Wilson
BY
ATTORNEY

Patented May 3, 1932

1,856,202

UNITED STATES PATENT OFFICE

LEON T. WILSON, OF CHATHAM, NEW JERSEY, ASSIGNOR TO AMERICAN TELEPHONE AND TELEGRAPH COMPANY, A CORPORATION OF NEW YORK

TESTING APPARATUS

Application filed June 10, 1931. Serial No. 543,445.

This invention relates to testing apparatus and more particularly to arrangements for measuring leakage conductances.

In studying the properties of transmission lines it is desirable to accurately measure the leakage conductance introduced into the lines by the insulators employed. From the standpoint of leakage the insulator is equivalent electrically to a leakage conductance shunted by a capacity.

One of the early methods of measuring the leakage conductance of the insulator involved connecting the insulator or group of insulators to be measured in one arm of a bridge so that in that arm there would be the equivalent of a conductance bridged by a capacity. In a balancing arm of the bridge a variable resistance in series with a variable capacity was connected and the resistance and capacity of the latter arm adjusted until the bridge was balanced. When a balance was obtained the conductance of the insulator would then be a function of the adjustment of the resistance, the adjustment of the capacity, and the frequency.

As this involved laborious computations of three variables for each measurement, the foregoing method was varied by arranging a fixed capacity in series with the variable resistance in the second arm of the bridge and shunting the conductance and capacity of the element to be measured by a variable capacity in the first arm of the bridge. By this arrangement the conductance of the element to be measured would be the only real component of the impedance of the first arm of the bridge and this real component would be balanced by the single adjustable resistance which constituted the only real component of the impedance in the second arm of the bridge. Therefore, when the condition of balance was obtained, the conductance of the element to be measured could be computed in terms of only two variables, namely, the variable resistance and the frequency.

Later on a method of balancing was devised in which the two arms of the bridge were normally provided with equal resistances. The resistance in the first arm of the bridge was connected in shunt with the unknown conductance and capacity of the element to be measured and the resistance in the second arm was connected in shunt with a capacity. A balance of the real components of the impedance was then effected by adjusting the resistance element in one of the arms. With this arrangement the leakage was for the condition of balance a function of the normal value of the two resistances, the adjusted value of the one resistance, and the amount of adjustment. This set-up had two advantages: (a) the conductance to be measured was under the conditions of balance independent of the frequency and was, furthermore, such a function of the several resistance values above mentioned that over a certain small range the conductance was approximately directly proportional to the amount of adjustment of the adjustable resistance and could, therefore, be read directly from the adjustment.

However, with this improved method it was found that the conductance to be measured could only be read directly from the amount of adjustment of the adjustable resistance over a relatively small part of the total range of conductance involved in carrier transmission. Accordingly, by the present invention an improved method of measurement has been provided in which the conductance to be measured may be read in terms of the adjustment of a resistance element over very much wider range of values than was possible with the former method. In accordance with the present invention the bridge, as before, is provided with two normally equal resistances in the two arms, one of these resistances being connected in shunt with the unknown conductance, and capacity of the element to be measured and the other resistance being connected in shunt with the capacity.

The bridge, in accordance with the new method, is balanced by varying the two resistances by equal increments in opposite directions or, in other words, by increasing the one resistance and decreasing the other. When the condition of balance is reached the conductance will be a function of the amount of adjustment of the two resistances and of the adjusted values of the two resistances. Since the departure from a linear relation between the value of the conductance and the amount of the adjustment for the one adjustable resistance is opposite to that resulting from an adjustment of the other resistance, the departures from linearity in the two cases tend to cancel each other so that the linear relation holds over a much wider range of values, and in practice it has been found that this range of values may be made to cover all values of conductance ordinarily encountered in the entire carrier frequency range over which the measurements are to be made.

Figure 3:
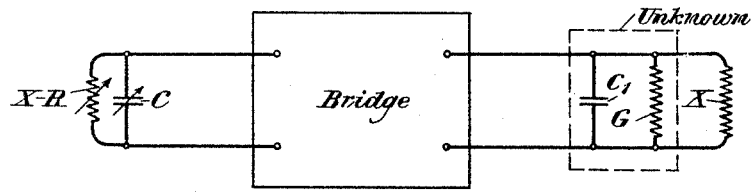
Figure 4:
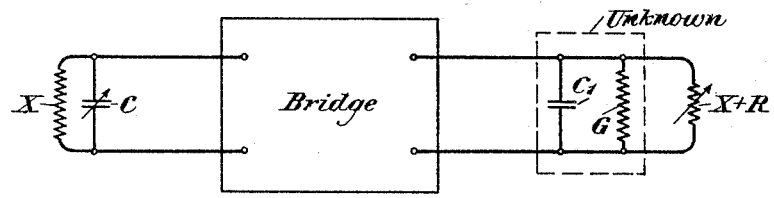
Figure 5:
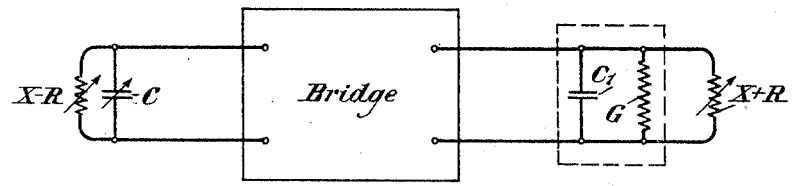

The invention will now be more fully understood from the following description, when read in connection with the accompanying drawings, Figures 1, 2, 3 and 4 of which show in simple schematic form different methods of balancing a bridge in order to make measurements of the conductance of insulators, and Fig. 5 is a similar diagram showing a method of balancing the bridge in accordance with the present invention.

The present invention, while applicable to the measurement of leakage conductances of any kind, is of particular importance in connection with tests of insulators such as are employed in transmission lines. For example, it has been common practice to set up a number of short transmission lines each involving a limited number of pairs of insulators upon cross-arms. Usually each short line to be measured involves about twenty-five pairs of insulators. Each insulator introduces a certain amount of leakage loss from the one line conductor to the other. If this combination of elements be viewed from one end of the line the arrangement is electrically equivalent to a leakage conductance shunted by a capacity, the combination being bridged across the two terminals at the end of the line. If, now, these two terminals of the line be connected in one arm of a bridge, the real and imaginary parts of the impedance as seen from the bridge may be balanced by a variable resistance in series with a variable capacity connected in a balancing arm of the bridge.

Such an arrangement is shown in Fig. 1 in which the insulator or combination of insulators whose conductance is measured is represented by a conductance G in shunt with a capacity $C_1$, these elements being balanced by the adjustable resistance R in series with the adjustable capacity C in the second arm of the bridge. The bridge, of course, may be of any balanced type such as a Wheatstone bridge, the two sets of elements above described being connected in two arms of the bridge. It has been found, however, that the hybrid coil type of bridge is an advantageous form of bridge to use, and accordingly, this type of bridge is illustrated in Fig. 1 and comprises a balanced transformer or hybrid coil 10 across the midpoint of which alternating current source S is connected, a receiver R being inductively related to the hybrid coil as shown. The two balancing arms are then connected to the opposite terminals of the line windings of the hybrid coil.

With this set-up it is evident that the impedance Z of the bridge arm comprising the variable resistance R and the variable capacity C will be represented by the following equation:

$$Z = R - \frac{1}{j\omega C} \quad (1)$$

in which $j$ is the operator $\sqrt{-1}$ and $\omega$ is $2\pi$ times the frequency. This equation may be rewritten in the following form:

$$\frac{1}{Z} = \frac{j\omega C}{Rj\omega C - 1} \quad (2)$$

Now by multiplying both numerator and denominator by $Rj\omega C + 1$, this expression becomes $$\frac{1}{Z} = \frac{R\omega^2 C^2}{R^2\omega^2 C^2 + 1} - \frac{j\omega C}{R^2\omega^2 C^2 + 1} \quad (3)$$

From Equation (3) it will be seen that the admittance (the reciprocal of the impedance) of the left-hand arm of the bridge in Fig. 1 has two components, a real component and an imaginary component. In order that a perfect balance may be obtained these two components must each be individually balanced by corresponding real and imaginary components of the admittance of the right-hand arm of the bridge. The real part of the admittance of the right-hand arm of the bridge is, of course, the unknown conductance G to be measured. Setting this equal to the real part of Equation (3) we have $$G = \frac{R\omega^2 C^2}{R^2\omega^2 C^2 + 1} \quad (4)$$

as the condition for balance. In actual practice the factor $R^2\omega^2 C^2$ is small compared with unity so that Equation (4) becomes $$G = R\omega^2 C^2 \text{ aproximately.} \quad (5)$$

From Equation (5) it will be seen that when the bridge is balanced the conductance will be a function of the adjusted value of the resistance R, the adjusted value of the capacity C, and of the frequency factor $\omega$. Therefore, in order to compute the value of the conductance G after the balance had been obtained R, C, and ω had to be known. Furthermore, since the conductance G is a function of the squares of C and ω these two factors had to be known accurately as a small error in either gave a magnified error in the conductance.

The calculations for the various values of G involved in a large number of measurements were very laborious when the method of balancing shown in Fig. 1 was employed. The matter was simplified somewhat, however, by employing the method of balance indicated in Fig. 2. Here the capacity C in the left-hand arm of the bridge is fixed and the adjustment for balancing the imaginary parts of the impedances of the two arms was obtained by adjusting a variable capacity $C_1'$ bridged across the right-hand arm of the bridge in shunt with the unknown capacity $C_1$ of the element to be measured. Under the condition of balance G would be a function of R, ω, and C, as indicated in Equation (5) but since C was fixed it was only necessary to make the computations in terms of the two variables R and ω.

While this reduced the labor of computing the values of G to some extent, it was found that the method of balancing shown in Fig. 3 would further reduce the labor of computation. In Fig. 3 the conductance G and the capacity $C_1$ of the unknown element to be measured was shunted by a resistance X. Instead of having a resistance and capacity in series in the balancing arm of the bridge as in Fig. 2, a variable capacity C is connected in shunt with a variable resistance $X-R$ in the balancing arm. Normally the variable resistance in the balancing arm has a value X equal to the corresponding resistance in the right-hand arm. In order to obtain a balance for both the real and imaginary components of the impedances of the two arms, the capacity C is adjusted and the resistance X is reduced by successive steps until a balance is obtained. For the condition of balance the resistance in the left-hand arm of the bridge has been reduced from a value X to a value $X-R$. The real part of the impedance of the right-hand arm is now due to the unknown conductance G in parallel with the resistance X while the real part of the impedance of the right-hand arm will be $X-R$. If the real parts of these two impedances are now equated we have:

$$G=\frac{R}{X(X-R)} \quad (6)$$

Consequently, under conditions of balance G is a direct function of R, the amount of adjustment of the left-hand resistance, and an inverse function of the normal value of the left-hand resistance, and the adjusted value of the left-hand resistance. From Equation (6) it will be apparent that this method of balancing has the advantage that G can be computed without taking into consideration the frequency. This method of balancing the bridge also has a further advantage for it will be noted from Equation (6) that when R is small, G is also small, and consequently, for small adjustments of the resistance in the left-hand arm the following approximation is quite accurate:

$$G=\frac{R}{X^2} \text{ (approximately)} \quad (7)$$

From Equation (7) it is evident that X being constant G is thus directly proportioned to R for small adjustments of the resistance in the right-hand arm of the bridge. However, this proportionality does not hold over much of the range of values of G encountered in tests of insulators to be used for carrier transmission and so the exact relation represented by Equation (6) had to be used in the computation of values of G for most of the range. Even so the method of balancing represented in Fig. 3 is quite useful and the calculations of G were much less laborious on the whole than for the methods of Figs. 1 and 2. A very important feature of the method of balancing shown in Fig. 3 is the elimination of both C, the fixed resistance, and ω the frequenction function, from the expression for G.

An arrangement similar to Fig. 3 is shown in Fig. 4. In this instance, however, the resistance X in the left-hand arm of the bridge remains fixed and the resistance in the right-hand arm of the bridge is increased from a normal value X by successive increments until a balance is obtained. Under conditions of balance the resistance in the right-hand arm of the bridge will have a value $X+R$, or, in other words, will have been increased by an amount R. The imaginary components of the impedances of the two arms of the bridge may be brought into equality as in Fig. 3 by adjusting the capacity C in the left-hand arm of the bridge or, if desired, the capacity C may remain fixed and an adjustable capacity shunted across the right-hand arm of the bridge may be varied as was done in the case of Fig. 2. In either event the adjustment of the capacity does not enter into the computation for the values of the conductance G.

Since the set-up of Fig. 4 is essentially similar to that of Fig. 3, under conditions of balance we have $$G=\frac{R}{X(X+R)} \quad (8)$$

and, again, for small values of G, $$G=\frac{R}{X^2} \text{ (approximately)} \quad (9)$$

It will be noted by comparing Equation (8) with Equation (6) that the departure from the linear relation in the case of Fig. 4 is in the opposite direction from what it was in the case of Fig. 3. This observation suggests the possibility that by combining these two methods the departure from the linear relation might be kept small over a wide range of G. This combination is illustrated in Fig. 5. Here the two resistances in the right-hand and left-hand arms of the bridge are as before made normally equal with a value X. In order to adjust the bridge the resistance in the right-hand arm is increased by steps and the resistance in the left-hand arm is decreased by equal increments until a balance is obtained, in which case the right-hand resistance will have been increased to X+R and the left-hand resistance will have been decreased to X−R. As before, the imaginary components of the impedances of the two arms may be adjusted by varying a capacity in either the right-hand or left-hand arm of the bridge.

When a balance is obtained the real component of the impedance of the left-hand is X−R and the real component of the impedance of the right-hand arm is equal to the conductance G in parallel with the conductance of the resistance X+R. Therefore G will have the value $$G = \frac{2R}{X^2 - R^2} \quad (10)$$

and where R the adjustment of each resistance is small, G may be represented as follows:

$$G = \frac{2R}{X^2} \text{ (approximately)} \quad (11)$$

In this case for the linear relation to hold it is only necessary that $R^2$ be small compared with $X^2$ while in the methods illustrated in Figs. 3 and 4 it was necessary that R be small as compared with X. Thus it is apparent that the arrangement of Fig. 5 makes a departure a second order one, and therefore, it should permit a wide range of G to be measured by use of the approximate expression of Equation (11) with good accuracy. If this is so then G is directly proportional to R and the measuring equipment can be arranged to read leakage conductance G directly or, better still, the leakage conductance per pair of insulators may be read directly by suitable calibration of the adjustable steps of either adjustable resistance.

As already stated, in measuring the conductance of insulators it has been the practice to arrange the insulators in pairs on cross-arms with wires strung along the cross-arms. The cross-arms for test purposes may be located close to each other instead of being separated by distances of the order of hundreds of feet as in actual pole line construction. Usually a group of twenty-five pairs of insulators is measured. Experience with tests of groups of insulators of this character shows that one micro-mho of conductance per pair of insulators is about as high a value as it is necessary to cover. For twenty-five pairs the maximum value of G then becomes 25 micro-mhos. For direct reading it is convenient to choose R=1000 ohms when the conductance G per pair is equal to 1 micro-mho. On this basis since $$X^2 = \frac{2R}{G}$$

approximately, $X^2 = 80\ (10)^6$ and $X = 8944.3$ ohms.

The following table gives the magnitude of error involved in employing the approximate relation.

| Nominal reading G per pair micro-mhos | True leakage G per pair micro-mhos | Per cent error |
|---|---|---|
| .100 | .1000 | 0 |
| .200 | .2001 | .05 |
| .500 | .5015 | .31 |
| .800 | .8065 | .81 |
| 1.110 | 1.1267 | 1.56 |

From this table it is evident that values of leakage up to about .9 micro-mho per pair can be measured without the error due to the approximation exceeding 1 per cent. As 95 per cent or more of the measurements have been found to fall in this range, the apparatus can thus be made direct reading for nearly all measurements.

Where the apparatus is calibrated for direct measurements in cases involving twenty-five pairs of insulators, correction must, of course, be made for the actual number of pairs where a lesser or greater number of pairs than twenty-five is to be measured.

For voice measurements .1 micro-mho per pair is as high as is generally required. Thus using the same variable resistance R to cover this range $X^2$ becomes $800\ (10)^6$ and $X = 28,284.3$ ohms. In this range the linear relation holds very accurately; in fact, better than $\frac{1}{10}$ of one per cent over most of the range.

It will be obvious that the general principles herein disclosed may be embodied in many other organizations widely different from those illustrated, without departing from the spirit of the invention as defined in the following claims.

What is claimed is:

1. The method of measuring the conductance of an unknown element which consists in connecting the unknown in one arm of a bridge having a balancing arm, connecting normally equal resistances in shunt with the unknown and in the balancing arm respectively, and increasing the one resistance and decreasing the other by equal amounts until a balance is obtained, whereupon the conductance to be measured will be approximately a direct function of the change in resistance necessary to produce a balance.

2. The method of measuring the conductance of an unknown element which is equivalent to a conductance shunted by a reactance, which method consists in connecting the unknown in one arm of a bridge having a reactance in its balancing arm, connecting normally equal resistances in shunt with the unknown and with said second-mentioned reactance, respectively, and increasing the one resistance and decreasing the other by equal amounts until a balance is obtained, whereupon the conductance to be measured will be approximately a direct function of the change in resistance necessary to produce a balance.

3. The method of measuring the conductance of an unknown element which is equivalent to a conductance shunted by a reactance, which method consists in connecting the unknown in one arm of a bridge having a reactance in its balancing arm, connecting normally equal resistances in shunt with the unknown and with said second-mentioned reactance respectively, and increasing the resistance in shunt with the unknown and decreasing the other resistance by equal amounts until a balance is obtained, whereupon the conductance to be measured will be approximately a direct function of the change in resistance necessary to produce a balance.

4. The method of measuring the conductance of an unknown element which is equivalent to a conductance G shunted by a capacity, which method consists in connecting the unknown in one arm of a bridge having a capacity in its balancing arm, connecting normally equal resistances X in shunt with the unknown and with said second-mentioned capacity, respectively, and increasing the one resistance and decreasing the other by equal amounts R until a balance is obtained, whereupon $$G = \frac{2R}{X^2}$$

approximately.

5. The method of measuring the conductance of an unknown element which is equivalent to a conductance G shunted by a capacity, which method consists in connecting the unknown in one arm of a bridge having a capacity in its balancing arm, connecting normally equal resistances X in shunt with the unknown and with said second-mentioned capacity, respectively, and increasing the resistance in shunt with the unknown and decreasing the other resistance by equal amounts R until a balance is obtained, whereupon $$G = \frac{2R}{X^2 - R^2}$$

over any range of values of G, and $$G = \frac{2R}{X^2}$$

approximately over a wide range of G.

6. In a bridge arrangement for measuring the conductance of an unknown element, said bridge including arms having normally equal adjustable resistances and having said unknown element connected in shunt with the resistance in one arm, the method of measuring the conductance of the unknown which consists in increasing one of said resistances and decreasing the other by equal amounts until the real components of the impedances of the arms are balanced, whereupon the conductance to be measured will be approximately a direct function of the change in resistance necessary to produce a balance.

7. In a bridge arrangement for measuring the conductance of an unknown element which is equivalent to a conductance shunted by a reactance, said bridge including arms having normally equal adjustable resistances and having said unknown element connected in shunt with the resistance in one arm and a reactance in shunt with the resistance in the other arm, the method of measuring the conductance of the unknown, which consists in increasing one of said resistances and decreasing the other by equal amounts until the real components of the impedances of the arms are balanced, whereupon the conductance to be measured will be approximately a direct function of the change in resistance necessary to produce a balance.

8. In a bridge arrangement for measuring the conductance of an unknown element which is equivalent to a conductance shunted by a reactance, said bridge including arms having normally equal adjustable resistances and having said unknown element connected in shunt with the resistance in one arm and a reactance in shunt with the resistance in the other arm, the method of measuring the conductance of the unknown, which consists in adjusting the reactance in one of the arms until the imaginary parts of the impedances of the arms are balanced and in increasing one of said resistances and decreasing the other by equal amounts until the real components of the impedances of the arms are balanced, whereupon the conductance to be measured will be approximately a direct function of the change in resistance necessary to produce a balance.

9. In a bridge arrangement for measuring the conductance of an unknown element which is equivalent to a conductance shunted by a reactance, said bridge including arms having normally equal adjustable resistances and having said unknown element connected in shunt with the resistance in the other arm, the method of measuring the conductance of the unknown, which consists in increasing the resistance in shunt with the unknown and decreasing the other resistance by equal amounts until the real components of the impedances of the arms are balanced, whereupon the conductance to be measured will be approximately a direct function of the change in resistance necessary to produce a balance.

10. In a bridge arrangement for measuring the conductance of an unknown element which is equivalent to a conductance shunted by a reactance, said bridge including arms having normally equal adjustable resistances and having said unknown element connected in shunt with the resistance in one arm and a reactance in shunt with the resistance in the other arm, the method of measuring the conductance of the unknown, which consists in adjusting the reactance in one of the arms until the imaginary parts of the impedances of the arms are balanced, and in increasing the resistance in shunt with the unknown and decreasing the other resistance by equal amounts until the real components of the impedances of the arms are balanced, whereupon the conductance to be measured will be approximately a direct function of the change in resistance necessary to produce a balance.

11. In a bridge arrangement for measuring the conductance of an unknown element which is equivalent to a conductance G shunted by a capacity, said bridge including arms having normally equal adjustable resistances X and having said unknown element connected in shunt with the resistance in one arm and a capacity in shunt with the resistance in the other arm, the method of measuring the conductance G of the unknown, which consists in increasing one of said resistances and decreasing the other by equal amounts R until the real components of the impedances of the arms are balanced, whereupon $$G = \frac{2R}{X^2}$$

approximately.

12. In a bridge arrangement for measuring the conductance of an unknown element which is equivalent to a conductance G shunted by a capacity, said bridge including arms having normally equal adjustable resistances X and having said unknown element connected in shunt with the resistance in one arm and a capacity in shunt with the resistance in the other arm, the method of measuring the conductance G of the unknown, which consists in adjusting the capacity in one of the arms until the imaginary parts of the impedances of the arms are balanced and in increasing one of said resistances and decreasing the other by equal amounts R until the real components of the impedances of the arms are balanced, whereupon $$G = \frac{2R}{X^2}$$

approximately.

13. In a bridge arrangement for measuring the conductance of an unknown element which is equivalent to a conductance G shunted by a capacity, said bridge including arms having normally equal adjustable resistances X and having said unknown element connected in shunt with the resistance in one arm and a capacity in shunt with the resistance in the other arm, the method of measuring the conductance G of the unknown, which consists in increasing the resistance X in shunt with the unknown and decreasing the other resistance by equal amounts R until the real components of the impedances of the arms are balanced, whereupon $$G = \frac{2R}{X^2 - R^2}$$

over any range of values of G and $$G = \frac{2R}{X^2}$$

approximately over a wide range of G.

14. In a bridge arrangement for measuring the conductance of an unknown element which is equivalent to a conductance G shunted by a capacity, said bridge including arms having normally equal adjustable resistances X and having said unknown element connected in shunt with the resistance in one arm and a capacity in shunt with the resistance in the other arm, the method of measuring the conductance G of the unknown, which consists in adjusting the capacity in one of the arms until the imaginary parts of the impedances of the arms are balanced and in increasing the resistance X in shunt with the unknown and decreasing the other resistance by equal amounts R until the real components of the impedances of the arms are balanced, whereupon $$G = \frac{2R}{X^2 - R^2}$$

over any range of values of G and $$G = \frac{2R}{X^2}$$

approximately over a wide range of G.

15. A bridge for measuring the conductance of an unknown element, said bridge having an arm in which the unknown may be connected and also having a balancing arm, normally equal resistances in the arms, the resistance in one arm being connected in shunt with the unknown and said resistances being capable of adjustment to increase the one and decrease the other by equal amounts until a balance is obtained, whereupon the conductance to be measured will be approximately a direct function of the change in resistance necessary to produce a balance.

16. A bridge for measuring the conductance of an unknown element which is equivalent to a conductance shunted by a reactance, said bridge having an arm in which the unknown may be connected and a balancing arm including a reactance normally equal resistances in the arms connected in shunt with the unknown and with said second-mentioned capacity, respectively, said resistances being capable of adjustment to increase the one and decrease the other by equal amounts until a balance is obtained, whereupon the conductance to be measured will be approximately a direct function of the change in resistance necessary to produce a balance.

17. A bridge for measuring the conductance of an unknown element which is equivalent to a conductance shunted by a reactance, said bridge having an arm in which the unknown may be connected and a balancing arm including a reactance, normally equal resistances in the arms connected in shunt with the unknown and with said second-mentioned reactance, respectively, said resistances being capable of adjustment to increase the resistance in shunt with the unknown and decrease the other resistance by equal amounts until a balance is obtained, whereupon the conductance to be measured will be approximately a direct function of the change in resistance necessary to produce a balance.

18. A bridge for measuring the conductance of an unknown element which is equivalent to a conductance G shunted by a capacity, said bridge having an arm in which the unknown may be connected and having a balancing arm including a capacity normally equal resistances X connected in the arms in shunt with the unknown and with said second-mentioned capacity, respectively, said resistances being capable of adjustment so that the one resistance may be increased and the other decreased by equal amounts R until a balance is obtained, whereupon the value of the conductance G may be read directly from the amount of adjustment of the resistance in accordance with the relation $$G = \frac{2R}{X^2}$$

approximately.

19. A bridge for measuring the conductance of an unknown element which is equivalent to a conductance G shunted by a capacity, said bridge having an arm in which the unknown may be connected and having a balancing arm including a capacity, normally equal resistances X connected in the arms in shunt with the unknown and with said second-mentioned capacity, respectively, said resistances being capable of adjustment so that the resistance in shunt with the unknown may be increased and the other resistance decreased by equal amounts R until a balance is obtained, whereupon for any value of G the relation $$G = \frac{2R}{X^2 - R^2}$$

will obtain and over a wide range of values of the value of G may be read directly from the change in values of said resistances in accordance with the relation $$G = \frac{2R}{X^2}$$

approximately.

In testimony whereof, I have signed my name to this specification this 8th day of June 1931.

LEON T. WILSON.